United States Patent [19]

Wilson et al.

[11] 4,199,255
[45] Apr. 22, 1980

[54] APPARATUS FOR USE IN GRADING HIDES, SKINS, PELTS AND THE LIKE

[75] Inventors: Raymond L. Wilson, Liverpool, England; Leslie J. Tilley, Edinburgh, Scotland

[73] Assignee: Edward Wilson and Son Ltd., Midlothian, Scotland

[21] Appl. No.: 827,050

[22] Filed: Aug. 23, 1977

[51] Int. Cl.² .............. G01N 21/00; G01N 21/16
[52] U.S. Cl. .................................. 356/72; 414/134; 356/73; 356/237
[58] Field of Search ............. 356/72, 73, 237, 238, 356/239; 214/11 R

[56] References Cited

U.S. PATENT DOCUMENTS

| 3,722,425 | 3/1973 | Allen | 214/11 R |
| 4,003,462 | 1/1977 | Perrott | 214/11 R |

Primary Examiner—Vincent P. McGraw
Attorney, Agent, or Firm—William A. Drucker

[57] ABSTRACT

Apparatus for grading hides, skins, pelts and the like according to thickness and quality includes means, for example a mechanical/electrical transducer, for providing a signal representative of thickness of a selected skin, means, for example manually operated push-buttons, for providing a signal representative of the quality of the skin and means responsive to both these signals for providing a signal representative of a product category for the skin. The product category signal may serve for sorting the skins into batches and preferably controls the application of an area signal for each selected skin in a category to summation means therefor enable control and/or display of total batch area. The skins may pass through the apparatus on an endless conveyor above which are disposed photoelectric scanning means to detect instantaneously the width of each passing skin to provide the area signal and a thickness transducer to bear against the skin to provide the thickness signal.

5 Claims, 5 Drawing Figures

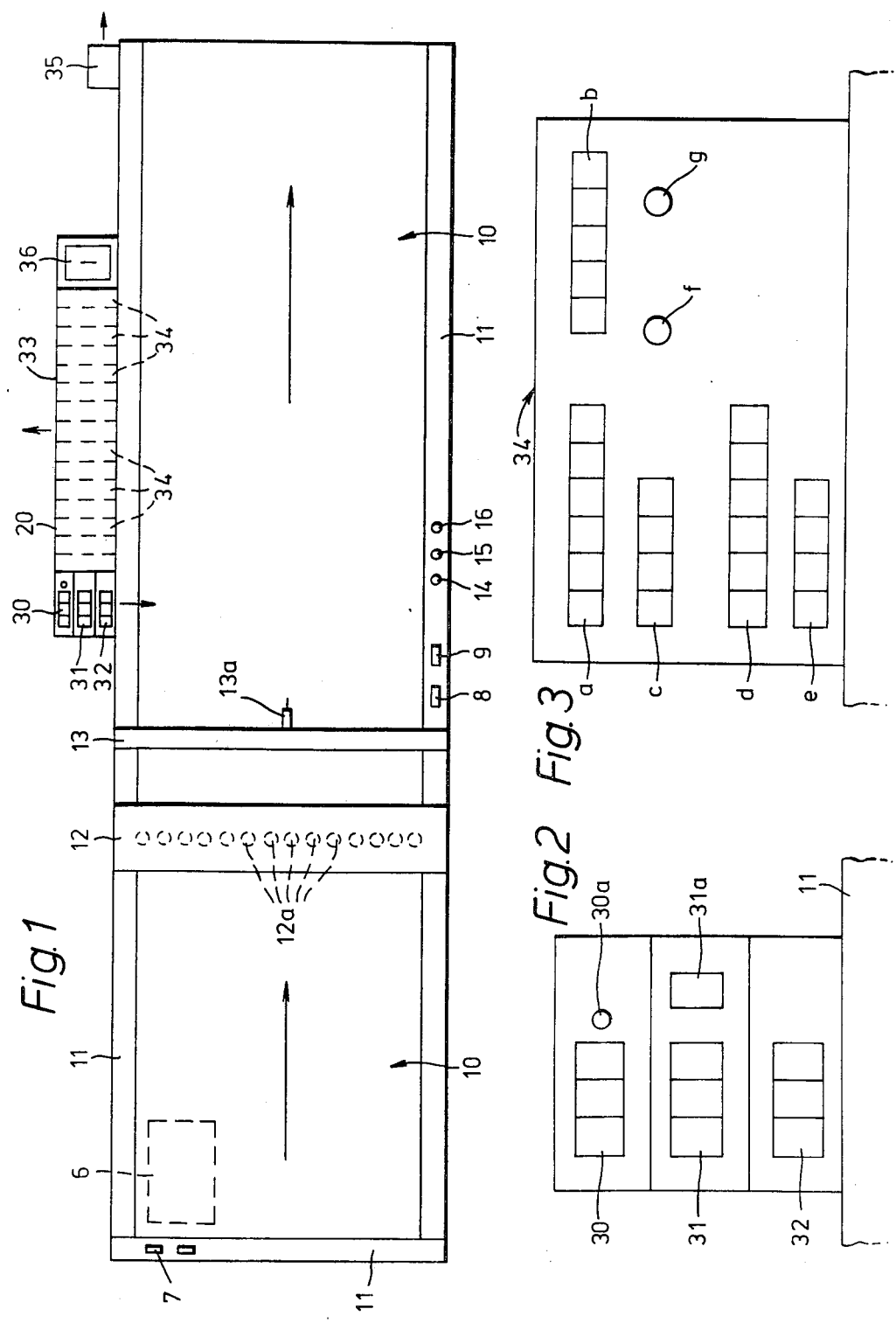

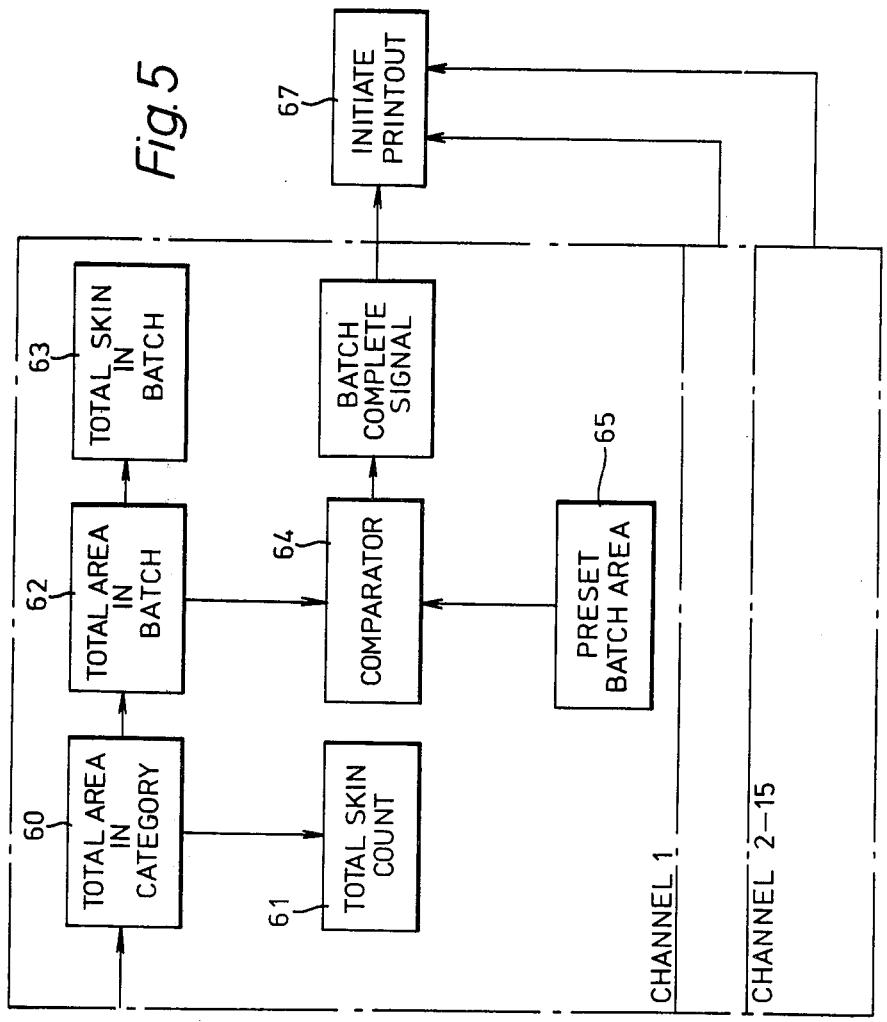

APPARATUS FOR USE IN GRADING HIDES, SKINS, PELTS AND THE LIKE

This invention is concerned with apparatus for use in grading hides, skins, pelts and the like, (all hereinafter for convenience included in the term "skins") in accordance with thickness and quality, and also for measuring the area of graded skins either singly, in batches, or in total.

In the tanning industry skins for being processed into leather usually are purchased by weight, and after tanning are sold by area. During the tanning process the skins remain ungraded and sorted until they reach a semi-processed state, known in the trade as the "wet-blue" stage, at which point it becomes necessary to grade by thickness and quality. Thickness measurement is conventionally effected either by feel or by means of a manually held caliper gauge. Quality grading is accomplished visually.

Obviously it is advantageous if the above sorting, and additionally the area, of the skins can automatically be determined and recorded. Such information enables the quantity of skins processed to the "wet-blue" stage to be limited to that which provides an area equal to the requirements of a particular objective thereby avoiding the necessity for over-processing, as at present a normal procedure, to ensure fulfillment of that objective. Further, it would enable processing drums e.g. dyeing drums, to be loaded by area as opposed to weight, which is acknowledged as being in many instances the most efficient method.

A further advantage is that if the area of each skin category is ascertainable at the "wet-blue" stage, this can be readily compared with the finished leather yield. Since the yield difference during the drying and finishing stages of the tanning process can be considerable, it is of great advvantage to be able to control and limit such differences on the basis of recorded data.

With the above important considerations in view, the present invention has for its object to provide an improvement in or modification of apparatus of the kind described in U.S. Pat. No. 4,060,734.

Apparatus according to said prior U.S. Patent broadly comprises an endless conveyor, a scanning head above said conveyor for measuring the area of each skin passing below same on the conveyor, and mechanical to electrical transducer means for bearing against each skin to measure the thickness thereof. Display means are provided for indicating the areas and thicknesses measured.

According to the present invention apparatus for grading skins according to thickness and quality comprises means for providing a signal representative of thickness of a selected skin, means for providing a signal representative of the quality of the skin and means responsive to both said signals for providing a signal representative of a product category for the skin.

Preferred embodiments of the invention include means for providing a signal representative of the area of the skin and means responsive to the said product category signal for controlling application of the area signal to summating means therefor, preferably by applying area signals for skins of the same category to a respective one of a plurality of summating means corresponding to the different categories. Provision may be made for displaying the total area of skins in a particular category and for indicating when the total area is equal to a predetermined latch area.

Means for providing the thickness signal may include transducer means, for example including a mechanical to electrical transducer, for measuring the skin thickness and means for allocating the measured thickness to one of a plurality of thickness grades.

Means for providing the quality signal may be operable to provide a signal representative of a selected one of a plurality of different quality grades and conveniently comprises push-buttons or switches operable manually to provide a signal representing a quality grade visually selected from a predetermined series of quality grades.

Thus, one embodiment of the apparatus according to the present invention broadly comprises an endless conveyor, photoelectric scanning means disposed above the conveyor for detecting the width of skins passing below same on the conveyor and means for integrating the ouput of the scanning means to provide a signal representative of the area of the skin, a mechanical to electrical transducer for measuring the thickness of a passing skin at a predetermined point thereon, display means for indicating the thickness measured, selection means for providing a signal representing in which of a plurality e.g. five of different thickness ranges the measured skin thickness lies, quality grading means e.g. push button switches, for allocating to each skin a quality grade selected from a predetermined series (e.g. three) of quality grades, means for allocating to each skin a final product category computed from the thickness and quality gradings, means for summating the areas of skins of a particular category, display means for indicating the allocated product categories whereby skins may be sorted as they are discharged from the conveyor, and display means indicating the batch area and total areas of the sorted and discharged skins.

In use of the apparatus, the electronic circuitry is so arranged that the mechanical to electrical transducer monitors the thickness of a skin as it passes down a preset line, and selects a point along the line at which a main reading is taken. This reading point may be a preset distance from the leading edge of the skin, or at a distance from the leading edge which is a preset percentage of the length of the skin. The scale of the reading is selectable, e.g. either in millimeters or in ounces. This latter is a recognised scale denoting thickness in the tanning industry. The thickness measured is routed into one of the predetermined thickness grades, and the grade selected is visually displayed. The quality of the skin is determined visually and inserted by manually operating one of the three quality selection switches.

The five thickness grades and the three quality grades are combined to provide fifteen product categories so that each skin as it moves along the conveyor is allocated one of 15 product categories and can be so sorted on discharge.

The area measurement of each skin is routed into one of the fifteen product category summating means and it is arranged for the total area of each category to be displayed on a "total area" counter. The skin area is also fed into a "batch area" counter where it is compared with a "preset area" counter, the arrangement being that when the "batch area" equals the "preset area" a signal is provided which indicates completion of the batch and that the "batch area" counter can be reset back to zero ready for a next batch of skins. Print out recording means may be incorporated in order that a permanent record may be provided of the data displayed.

The invention is further described with the aid of the accompanying drawings which illustrate schematically and by way of example only one embodiment.

In said drawings:

FIG. 1 is a schematic plan view of apparatus according to the invention.

FIG. 2 illustrates schematically the display means of the control circuitry enclosure.

FIG. 3 illustrates one of the product category counter displays.

FIGS. 4 and 5 are block diagrams illustrative of the electronic circuitry layout of the apparatus.

Figure 4:
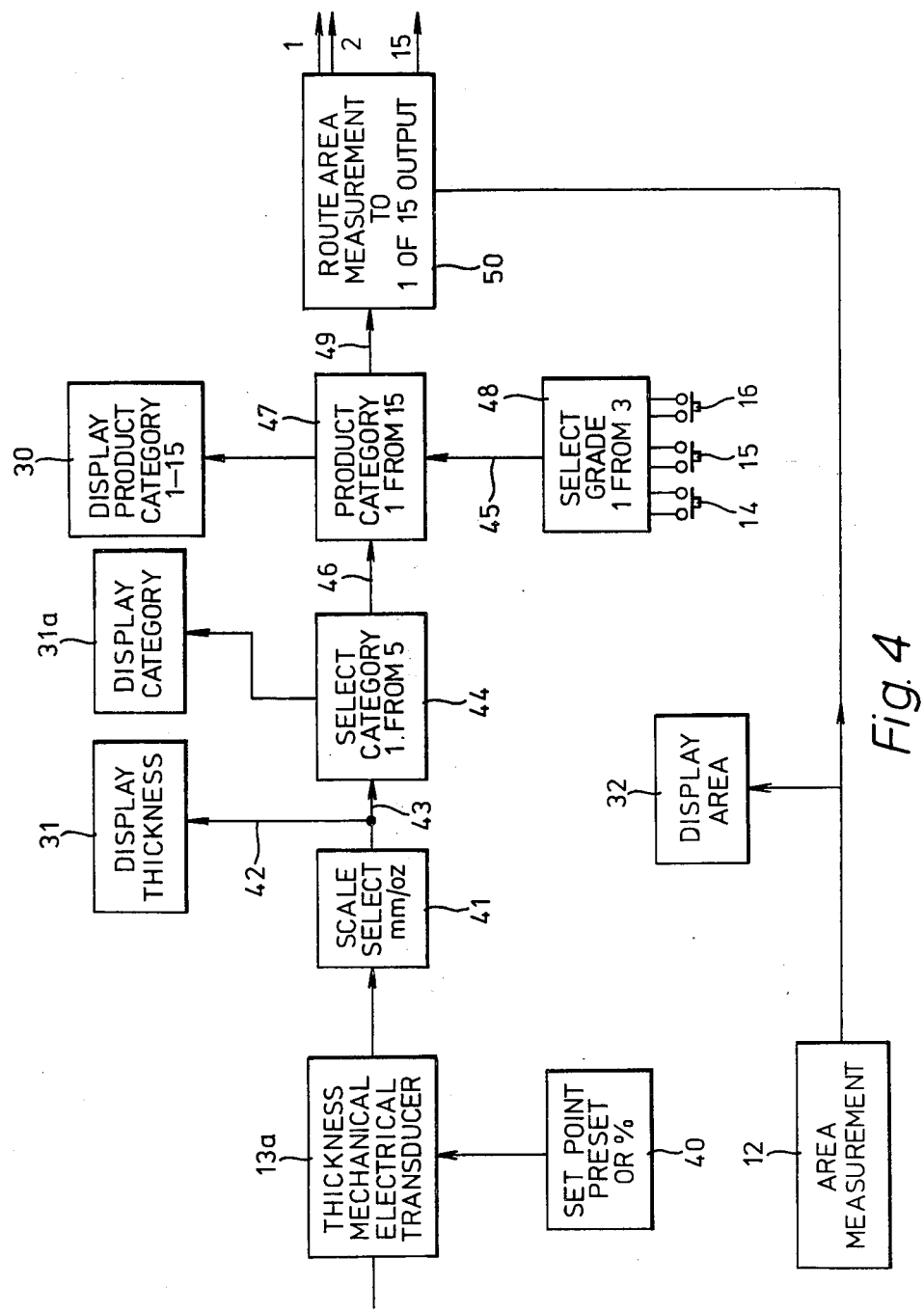

Referring to said drawings, 10 generally denotes an endless conveyor supported by a frame 11, said conveyor being of a matt non-reflective finish and driven by a self contained motor unit 6 controlled by a push button starter 7 and preferably two remote control switches 8 and 9. Disposed transversely above said conveyor is an area measurement photoelectric scanning head 12 adapted to operate in substantially the same manner as described in said U.S. Pat. No. 4,060,734. Said bridge 12 contains individually adjustable photocell units 12a at 50 mm spacing and is fitted with stray-light cut-off curtains and two air purge connection points for ensuring non-contamination of the components within the enclosures by foreign matter.

Also provided over said conveyor 10 is a thickness measurement bridge 13 incorporating a centrally positioned mechanical to electrical transducer 13a for measuring the thickness of skins passing below same, for example in the manner described in said U.S. Pat. No. 4,060,734.

Down stream of the area measuring bridge 13 are three (in this instance) push button switches 14, 15 and 16. These switches are the means whereby a skilled operator can by visual observation allocate to each skin passing before him on the conveyor a quality grade.

On the opposite side of the conveyor facing the quality selection position, are control and display enclosures, generally designated 20, and which include, see FIG. 2, a two digit "product category" display 30 which preferably includes a warning lamp 30a to indicate any failure of the display indicators; a three digit "thickness" display 31 which is switchable to read in mm or oz. and includes a "thickness grade" indicator 31a; a three digit "area" display 32 which is switchable to read in square feet or square decimeters; and a "product category" counter 33 incorporating 15 modules 34 (FIG. 3), one for each category, and each of which comprises a six digit "batch area" display a, a five digit "batch preset" display b, a four digit "batch count" display c, a six digit "area display" d, a four digit "total count" display e, a "batch complete" alarm f, and a "reset" push button switch g.

All the displays are preferably of a mechanical nature in order that their readings will be retained even when the apparatus is switched off.

At the delivery end of the conveyor structure there is provided a "repeat category" display 35, and the enclosures 20 incorporate a twin tape line printer 36 for providing a read out of selected data. For example, the printer may provide a read-out of "batch area" counts in respect of each of the fifteen product categories.

The displays operate as follows: when each skin has been measured and sorted, its area is automatically entered into the "batch area" and "total area" diaplays a and d, and one unit is added to the "batch count" and "total count" displays c and e. When the "batch area" reading a reaches the "batch preset" reading b, the warning lamp f, as also an audible alarm if required, is activated and the "batch area" and "batch count" is reproduced on the printer tape. Also, the displays a and e are returned to zero. The alarm preferably continues until the reset button g is pressed. This functions as a reminder to remove the particular batch of skins just completed and/or to reset the "batch preset" display b if necessary. The "total area" and "total count" displays d and c continue until intentionally reset to zero.

The block diagrams of FIGS. 4 and 5 illustrate schematically a typical electronic sequence layout for effecting the functions above described.

Mechanical to electrical transducer 13a generates a signal representative of the skin thickness measured at a point, determined by preset means 40, at a predetermined distance along, or as a percentage of, the length of the skin. The thickness measurement signal is supplied by way of scale selection means 41 and line 42 to thickness display means 31 and by way of line 43 to selection means 44 where it is compared with, and allocated to one of, five thickness grades, the selected grade being displayed by display means 31a. A signal representing the selected thickness grade, in binary coded decimal form, is supplied from the selection means 44 by way of line 46 to product category selection means 47, which also receives a quality grade signal from quality selection means 48 which comprises push-tuttons 14, 15 and 16 enabling the operator to allocate to the skin a visually determined quality grade selected from three possible grades.

In response to the thickness and quality grade signals, the product category selection means 47 allocates to the skin one of fifteen product categories. The selected category is displayed by product category display 30, and a signal representing the product category for the skin is supplied from means 47 by way of line 49 to routing means 50 comprising a suitable set of logic gates, for controlling the application of the area signal, supplied thereto by way of line 51 from area measuring means 12, to a respective one of fifteen area signal summating means corresponding to the fifteen product categories.

One area signal summating means is illustrated in FIG. 5 and includes a counter 60 for summing and displaying the total area of the skins of the product category and a counter 61, serving to indicate the number of skins corresponding to the displayed total area for the category.

Similar counters 62 and 63, serve to sum and display respectively the area and number of skins, but are resettable to zero independently of the counters 60 and 61. A comparator 64 compares the contents of the area summing counter 62 with batch area preset means 65 and, when the batch is complete, provides a batch complete signal to initiate operation of the print-out means 66 and to indicate that the batch is complete and can be removed.

We claim:

1. Apparatus, for grading skins, comprising an endless conveyor, photoelectric scanning means disposed above the conveyor for detecting the width of each skin passing below the scanning means on the conveyor, means for integrating the output of the scanning means to provide a signal representative of the area of each skin, a mechanical to electrical transducer for measuring the thickness of each skin at a predetermined point thereon, display means for indicating the thickness measured, selection means for providing a signal representing in which of a number of different thickness ranges each measured skin thickness lies, grading switches for allocating to each skin a quality grade selected from a predetermined number of quality grades, means for allocating to each skin a final product category computed from the thickness and quality gradings, means for summating the areas of skins of a particular product category, display means for indicating the allocated product category of each skin whereby the skins may be sorted as they are discharged from the conveyor, and display means indicating the batch area and total areas of the sorted and discharged skins.

2. Apparatus, as claimed in claim 1, wherein said quality grading switches are manually operable push-button switches for operation by an operator according to a visually determined quality of skin.

3. Apparatus, as claimed in claim 1, wherein means is provided for comparing a "batch area" count with a "preset area" count and, when the "batch area" count equals the "preset area" count, providing a signal which indicates completion of a batch.

4. Apparatus, as claimed in claim 3, including a twin tape line printer for providing a read-out of selective data.

5. Apparatus, as claimed in claim 1, wherein said display means has five different thickness ranges, and wherein said grading switch represent respectively three quality grades, thereby to provide fifteen product categories into which skins can be allocated.

* * * * *